(12) United States Patent
Sullivan et al.

(10) Patent No.: US 11,235,556 B2
(45) Date of Patent: Feb. 1, 2022

(54) FINISHED COMPOSITE TEXTILE MATERIAL

(71) Applicant: Crypton, Inc., Bloomfield Hills, MI (US)

(72) Inventors: Alfred Hardy Sullivan, Charlotte, NC (US); Michael Grigat, Fort Mill, SC (US); Jonathan Wesley Brown, Cherryville, NC (US); Michael Steven Hall, Belmont, NC (US)

(73) Assignee: Crypton, Inc., Bloomfield Hills, MI (US)

( * ) Notice: Subject to any disclaimer, the term of this patent is extended or adjusted under 35 U.S.C. 154(b) by 4 days.

(21) Appl. No.: 16/908,062

(22) Filed: Jun. 22, 2020

(65) Prior Publication Data
US 2020/0316909 A1    Oct. 8, 2020

Related U.S. Application Data

(63) Continuation of application No. 15/973,748, filed on May 8, 2018, now abandoned.

(51) Int. Cl.
| | |
|---|---|
| *B32B 7/14* | (2006.01) |
| *B32B 27/40* | (2006.01) |
| *B32B 27/12* | (2006.01) |

(52) U.S. Cl.
CPC .............. *B32B 7/14* (2013.01); *B32B 27/12* (2013.01); *B32B 27/40* (2013.01); *B32B 2255/26* (2013.01); *B32B 2307/3065* (2013.01); *B32B 2307/726* (2013.01); *B32B 2307/7246* (2013.01); *B32B 2307/7265* (2013.01)

(58) Field of Classification Search
CPC ........... B32B 7/14; B32B 27/40; B32B 27/12; B32B 2307/3065
USPC ........................................................ 428/201
See application file for complete search history.

(56) References Cited

U.S. PATENT DOCUMENTS

| | | | |
|---|---|---|---|
| 8,822,354 | B2 | 9/2014 | White |
| 9,790,629 | B2 | 10/2017 | Anderson et al. |
| 9,850,603 | B2 | 12/2017 | Newkirk et al. |
| 2003/0211291 | A1 | 11/2003 | Castiglione et al. |

(Continued)

FOREIGN PATENT DOCUMENTS

| | | |
|---|---|---|
| JP | 2003247146 A | 9/2003 |
| WO | 2017160800 A1 | 9/2017 |

*Primary Examiner* — Betelhem Shewareged
(74) *Attorney, Agent, or Firm* — Brooks Kushman P.C.

(57) ABSTRACT

A finished composite material having a film layer, a fibrous material layer and a discontinuous adhesive region layer situated between the film layer and the fibrous material layer. The discontinuous adhesive region layer adheres the film layer to the fibrous material layer. The discontinuous adhesive layer forms a number of discrete and non-continuous regions including an interface between the film layer and the fibrous material layer such that the film layer touches the fibrous material layer at the interface. The number of discrete and non-continuous regions forms a number of non-adhesive regions therebetween configured to not resist flexing of the film layer and the fibrous material layer. The finished composite material further includes an upholstery or mattress textile fabric substrate having a thickness of 0.5 to 2.0 millimeters. The front surface of the upholstery or mattress textile fabric substrate is configured to contact a user of the fabric substrate.

20 Claims, 2 Drawing Sheets

(56) References Cited

U.S. PATENT DOCUMENTS

| | | |
|---|---|---|
| 2004/0209021 A1 | 10/2004 | Shih |
| 2005/0266228 A1 | 12/2005 | Jain et al. |
| 2007/0237916 A1 | 10/2007 | Rasmussen et al. |
| 2008/0160298 A1 | 7/2008 | Li et al. |
| 2009/0170392 A1 | 7/2009 | Bruchmann et al. |
| 2009/0255625 A1 | 10/2009 | Fox et al. |
| 2015/0079339 A1 | 3/2015 | Covelli et al. |
| 2015/0111014 A1 | 4/2015 | Crabb et al. |
| 2018/0317666 A1* | 11/2018 | Clarke .................... B29C 73/10 |
| 2019/0344539 A1 | 11/2019 | Sullivan et al. |
| 2020/0316909 A1* | 10/2020 | Sullivan .................. B32B 27/12 |

* cited by examiner

FINISHED COMPOSITE TEXTILE MATERIAL

CROSS-REFERENCE TO RELATED APPLICATION

This application is a continuation of U.S. application Ser. No. 15/973,748, now abandoned, filed on May 8, 2018, the disclosure of which is incorporated herein by reference in its entirety.

TECHNICAL FIELD

The present invention relates to finished composite textile material, where the textile may be an upholstery or mattress textile fabric.

BACKGROUND

Treated fabrics with chemicals have been widely utilized in several applications. Non-limiting examples of such applications include applying chemical treatments to fabrics to impart certain properties to the fabric. One example of a property is flame retardancy. Other properties include water repellency, water penetration resistance, abrasion resistance, and breathability. Although these prior art treatments and treated fabrics have been utilized, improvements are desired. There is a need for improved treatments and treated fabrics that have improved flame retardancy with enhanced pliability and drape and/or a more natural surface contact.

SUMMARY

In one embodiment, a finished composite material is disclosed. The finished composite material includes a film layer having first and second surfaces, a fibrous material layer having first and second surfaces and a discontinuous adhesive region layer situated between the film layer and the fibrous material layer. The discontinuous adhesive region layer adheres the second surface of the film layer to the first surface of the fibrous material layer. The discontinuous adhesive layer forms a number of discrete and non-continuous regions including an interface between the second surface of the film layer and the first surface of the fibrous material layer such that the second surface of the film layer touches the first surface of the fibrous material layer at the interface. The number of discrete and non-continuous regions forms a number of non-adhesive regions therebetween configured to not resist flexing of the film layer and the fibrous material layer. The finished composite material further includes an upholstery or mattress textile fabric substrate having a thickness of 0.5 to 2.0 millimeters and having front and back surfaces. The front surface of the upholstery or mattress textile fabric substrate is configured to contact a user of the upholstery or mattress textile fabric substrate.

In another embodiment, a finished composite material is disclosed. The finished composite material includes a film layer having first and second surfaces, a fibrous material layer having first and second surfaces and a backcoat layer including a non-acrylic binder and having first and second surfaces. The second surface of the film layer is applied to the first surface of the fibrous material layer. The second surface of the backcoat layer is applied to the first surface of the film layer. The finished composite material includes a discontinuous adhesive region layer situated between the film layer and the fibrous material layer. The discontinuous adhesive region layer adheres the second surface of the film layer to the first surface of the fibrous material layer. The discontinuous adhesive layer also forms a number of discrete and non-continuous regions including an interface between the second surface of the film layer and the first surface of the fibrous material layer such that the second surface of the film layer touches the first surface of the fibrous material layer at the interface. The number of discrete and non-continuous regions forms a number of non-adhesive regions therebetween configured to not resist flexing of the backcoat layer, the film layer and the fibrous material layer. The finished composite material further includes an upholstery or mattress textile fabric substrate having a thickness of 0.5 to 2.0 millimeters and having front and back surfaces. The second surface of the fibrous material layer faces away from the back surface of the upholstery or mattress textile fabric substrate. The front surface of the upholstery or mattress textile fabric substrate is configured to contact a user of the upholstery or mattress textile fabric substrate.

In yet another embodiment, a finished composite material is disclosed. The finished composite material includes a backcoat layer having first and second surfaces and a film layer having first and second surfaces. The second surface of the film layer is applied to the first surface of the backcoat layer. The finished composite material includes an upholstery or mattress textile fabric substrate having a thickness of 0.5 to 2.0 millimeters and having front and back surfaces. The second surface of the backcoat layer faces away from the front surface of the upholstery or mattress textile fabric substrate. The front surface of the upholstery or mattress textile fabric substrate is configured to contact a user of the upholstery or mattress textile fabric substrate. The finished composite material also includes a discontinuous adhesive region layer situated between the film layer and the upholstery or mattress fabric substrate. The discontinuous adhesive region layer adheres the first surface of the film layer to the back surface of the upholstery or mattress fabric substrate. The discontinuous adhesive layer forms a number of discrete and non-continuous regions including an interface between the first surface of the film layer and the back surface of the upholstery or mattress textile fabric substrate such that the first surface of the film layer touches the back surface of the upholstery or mattress textile fabric substrate at the interface. The number of discrete and non-continuous regions form a number of non-adhesive regions therebetween configured to not resist flexing of the backcoat layer, the film layer and the upholstery or mattress textile fabric substrate.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Except in examples, or where otherwise expressly indicated, all numerical quantities in this description indicating amounts of material or conditions of reaction and/or use are to be understood as modified by the word "about" in describing the broadest scope of the invention. Unless expressly stated to the contrary: percent, "parts of," and ratio values are by weight; the term "polymer" includes "oligomer," "copolymer," "terpolymer," and the like; the description of a group or class of materials as suitable or preferred for a given purpose in connection with the invention implies that mixtures of any two or more of the members of the group or class are equally suitable or preferred; molecular weights provided for any polymers refers to number average molecular weight; description of constituents in chemical terms refers to constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

The term "about" may be used herein to describe disclosed or claimed embodiments. The term "about" may modify a value disclosed or claimed in the present disclosure. In such instances, "about" may signify that the value it modifies is within ±0%, 0.1%, 0.5%, 1%, 2%, 3%, 4%, 5% or 10% of the value.

Developing chemical treatments for fabrics to impart flame retardancy properties is increasing because of the proliferation of stringent flammability specifications. Standard setting organizations in the European Union (EU) and European countries have enacted stringent standards. The International Maritime Organization (IMO), which is the organization that ensures materials on ocean-going vessels meet safety standards, has also given flame retardancy of fabrics heightened scrutiny. In certain aspects, the flammability requirements of the EU, European countries and the IMO are more difficult to satisfy than the default United States flammability standards, which are set forth in California's Technical Bulletin 133.

While current proposals for temporary and permanent flame retardant fabrics exist, the treatment to impart permanent flame retardancy may create a resulting treated fabric with undesirable characteristics, and temporary flame retardancy may be unacceptable for certain applications. As an example of temporary flame retardancy, a flame retardant salt may be applied to a fabric substrate. However, if the flame retardant salt is water soluble, it may dissolve over several washings, and therefore, does not have the wear durability of permanent flame retardancy. Known permanent flame retardant treated fabrics commonly have poor hand, drape and/or pliability. For instance, current proposals include methods in which a backcoating including a fire retardant material is applied to a fabric material. The resulting treated fabric may have undesirable characteristics, such as poor hand. This is especially true of fabric materials that are textural and have a relatively high porosity. Current proposals also include applying a film moisture barrier to a fabric material. These applications also may produce a treated fabric with poor hand and/or other undesirable characteristics, such as insufficient flame resistance.

The term "hand" may refer to the way a fabric feels when touched. In many instances, permanent flame retardant treated fabrics have a greasy residue when touched that transfers to the users' fingertips. This greasiness contributes to bad hand. Good hand refers to treated fabrics that exhibit shape retention without stiffness, and do not leave behind a greasy residue. The term "drape" may refer to the manner in which a cloth falls or hangs, e.g., how easily does the fabric flow down over something else. The term "pliability" may refer to the degree of conformance of a fabric to angular or curved shapes, and can be measured in terms of flexural rigidity, bending rigidity, or bending resistance. Accordingly, there remains a need for improved treated fabric products that have satisfactory permanent flame retardancy with a more natural surface contact, hand, better drape, and/or better pliability.

In one or more embodiments, treated fabrics and methods of forming the same and in particular multilayer substrates for application to fabrics to form finished composite materials are disclosed. The treated fabrics may impart flame retardancy properties onto the finished composite materials while maintaining a more natural hand and/or better pliability. In certain embodiments, a multilayer substrate is created offline from the fabric treatment process. By doing so, production efficiencies and cost reductions can be realized. The multilayer substrates may be applied to a fabric to create a finished composite material, where the back surface (as defined herein) of the composite is low-friction and soft and has a pleasing hand.

The finished composite materials include a substrate. In certain embodiments, the substrate is a fabric substrate. The fabric substrate may be in the form of a sheet. The thickness of the sheet may be 0.5 to 2.0 mm. The fabric substrate comes into contact with the end user of the fabric application (e.g., bedding, upholstery, drapery, etc.). According to one or more embodiments, the fabric substrate is treated with a multilayer substrate or a different treatment to yield a finished composite material. The fabric substrate may be made of a textile material, such as woven, nonwoven and knitted fabrics, and one or more components made from yarn-dyed or piece-dyed upholstery woven fabrics of natural fibers, synthetic fibers and mixtures of natural and synthetic fibers. Suitable natural fibers include without limitation fibers of cotton, linen, ramie, silk, wool, and the like. Suitable synthetic fibers include without limitation fibers of polyamides (nylon), polyester, polyacrylic, rayon (viscose), polypropylene, polylactic acid, and the like. In one or more embodiments, a synthetic fabric is a fabric containing at least 40 weight percent of synthetic polymer fibers, e.g., nylon fibers, polyester fibers, and the like.

Suitable fabrics also include without limitation jacquards (i.e., fabrics manufactured from a jacquard loom), and dobbys (i.e., fabrics manufactured from a dobby loom). The fabric substrate can also be one or more blends of any of the mentioned fabrics or components.

The fabric substrate has a front surface that is exposed to the user and a back surface that is not exposed to the user in the finished application (e.g., bedding or upholstery). A backcoating or multilayer substrate may be applied to the back surface of the face fabric before or after backcoating or lamination. In one or more embodiments, the fabric substrate can be treated with one or more durable finishes before or after application of the backcoating or multilayer substrate to impart certain desired properties onto the fabric substrate. Non-limiting examples of such properties include oil repellency, water repellency, soil repellency, stain repellency, liquid repellency, stain release, antibacterial, antifungal, odor neutralizer, water resistance, temperature modulation via phase change material or radiant heat reflection material, and flame retardancy. Non-limiting examples of the durable finish materials include fluorinated oil and water repellent finishes, fluorinated oil repellent finishes, fluorinated soil repellent finishes, fluorinated liquid and stain repellent finishes, fluorinated dual-action repellent and stain release finishes, non-fluorinated repellent finishes, hydrophilic stain release finishes, antibacterial finishes, antifungal finishes, odor neutralizers, and flame retardant finishes. Non-limiting examples of phase change materials include core-shell products in which the core is more temperature sensitive than the shell. For instance, the shell may be a solid material and the core material is a phase change material sensitive to temperature changes. The core material may solidify (and release energy) or melt (and absorb energy) depending on the temperature.

The multilayer substrate may be applied to one of the surfaces of the fabric substrate. In one embodiment, the multilayer substrate is applied to the back surface of the fabric substrate. The multilayer substrate may be applied to the back surface using a gravure lamination process using a hotmelt adhesive. In certain embodiments, the hotmelt adhesive includes a flame retardant polymer. Hotmelt adhesives may be easily transported in a solid state and applied in a liquid state following heating. Non-limiting examples of hotmelt adhesives for use in one or more embodiments include thermoplastic materials, such as, polyethylene, polypropylene, polyamide, and polyester.

In other embodiments, a reactive polyurethane (PUR) adhesive can be used as the hotmelt adhesive. When certain PUR adhesives are melted from its solid form, the chemical functional groups in the PUR adhesive react with humidity in the air to create a product that cannot be melted a second time once the adhesive cools. Certain PUR adhesives may also resist separation due to reheating and/or multiple launderings. PUR adhesives may react with a material surface when in the presence of moisture. The PUR adhesive is initially in the form of a thermoplastic material, but when it is exposed to moisture in air, it becomes thermoset over a period of time (e.g., 1, 2, 3, 4, or 5 days) as the reaction takes place. During this curing period, it is important for the PUR material to remain undisturbed. If the PUR adhesive is disturbed before full cure, then the bond strength could be permanently reduced. The PUR adhesive is heated to a flowability temperature so that it can be presented uniformly to a surface for adhering to a second surface. The flowability temperature may be any one of the following values or within a range of any two of the following values: about 90, 95, 100, 105, 110, 115, 120, 125, 130, and 132° C. Once the PUR adhesive is converted into a thermoset material, it maintains good flexibility and elasticity, which makes it ideal for flexible substrates, such as fabrics or films.

In another process, the hotmelt adhesive may be supplied in the form of a hotmelt adhesive film or web. The film or web may be brought into contact with the fabric substrate between upper and lower heated rollers to heat the film or web and to apply the film or web to the fabric substrate. Before the adhesive film or web cools, it is brought into contact with the multilayer substrate under appropriate temperature and pressure conditions to adhere the multilayer substrate to the fabric substrate to form a finished composite material. The appropriate temperature may be any one of the following values or within a range of any two of the following values: about 90, 95, 100, 105, 110, 115, 120, 125, 130, and 132° C. The appropriate pressure may be any one of the following values or within a range of any two of the following values: about 1, 2, 3, 4, 5, and 6 bar nip pressure.

A lamination process can be used to apply different layers of a multilayer substrate or to apply a multilayer substrate to a fabric substrate. The lamination process may be a process that uses a roller with a shaping characteristic on the surface of the roller. For example, the roller may have a smooth shaping characteristic. In other embodiments, the roller may have feature lines or pattern cavities and the lamination process may be a roto-gravure lamination process. A roto-gravure lamination process may be used to apply small quantities of adhesive in a discrete and non-continuous format. The applied weight of the application of adhesive with a roto-gravure process may be any one of the following values or within a range of any two of the following values: 5, 10, 15, 20, 25, or 30 grams per meter (gsm). Regions with no adhesive are formed between the discrete regions of adhesive. These regions with no adhesive do not resist flexing, other than surface to surface friction between the surfaces of adjacent layers in those regions.

In another embodiment, an extrusion process may be used to apply a fibrous material layer to a film layer as a carrier. The fibrous material may be heated so that when it is applied to the film layer, the film layer melts and later solidifies to attach the fibrous material to the film. In certain instances, the film may be a thermoplastic film.

The gravure lamination process may include applying a pattern of microscopic regions of adhesive to the back surface of the fabric substrate to bond the multilayer substrate to the fabric substrate to form a finished composite material. In one gravure lamination process, the adhesive is heated until an acceptable viscosity is reached, for example 3,000 to 20,000 centipoise. A rotating gravure roll contacts the heated adhesive, thereby filling cavities with the adhesive. A doctor blade is applied to the surface of the gravure roll to remove excess adhesive and ensure that adhesive is only applied to the back surface in the pattern of the cavities.

The fabric or multilayer substrate is presented to the gravure roll, after which time the fabric and multilayer substrate pass through a nip point. The fabric substrate contacts the multilayer substrate under appropriate pressure conditions to adhere the multilayer substrate to the fabric substrate to form a finished composite material. The appropriate pressure may be any one of the following values or within a range of any two of the following values: about 1, 2, 3, 4, 5, and 6 bar nip pressure.

The multilayer substrate may be produced offline of the process for applying the multilayer substrate to the textile material. The multilayer substrate material may be stored (e.g., on a spool) before the application process. The offline pre-production of the multilayer substrate decouples production of the substrate from the application and curing process, which can take a relatively long period of time, e.g., a PUR adhesive takes 1 to 5 days to cure depending on ambient temperature and relative humidity. Also, certain complexities may be involved in the application process that may negatively impact normal processing conditions, including product mix demands, labor availability, and a variety of other production delays. The decoupling of the production of the substrates from the application and curing process may have the benefit of shortening lead time. Another benefit of the offline production of a multilayer substrate is that the substrate production process can be done at a facility separate from the treatment of the fabric substrate, and later shipped to a different facility to apply the substrate to the fabric substrate. Accordingly, the substrate production process can be more easily kept secret at the separate facility.

Figure 1:
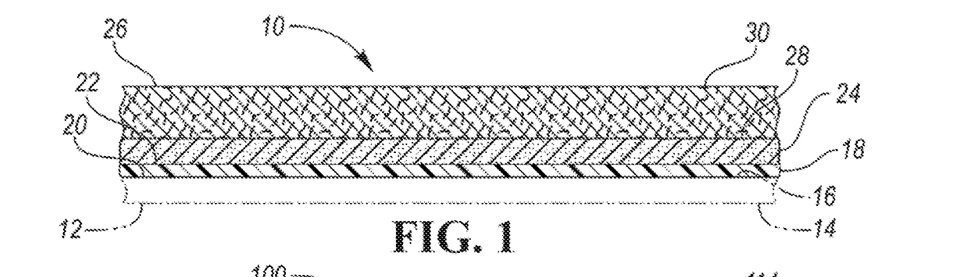
FIG. 1 depicts a cross-sectional view of a multilayer substrate according to an embodiment.

FIG. 1 depicts a cross-sectional view of a multilayer substrate 10 according to an embodiment. The multilayer substrate 10 includes backcoat layer 12 having first and second surfaces 14 and 16, film layer 18 having first and second surfaces 20 and 22, and layer 26 having first and second surfaces 28 and 30. As shown in FIG. 1, layer 26 is a nonwoven layer. However, in other embodiments, layer 26 may be a woven or knit layer. Nonwoven layer 26 is applied to second surface 22 of film layer 18 to form an interface between second surface 22 of film layer 18 and first surface 28 of nonwoven layer 26. Backcoat layer 12 is applied to first surface 22 of film layer 18 to form an interface between first surface 22 of film layer 18 and second surface 16 of backcoat layer 12. A phase change material may be incorporated in backcoat layer 12. In certain embodiments, backcoat layer 12 is optional and is not utilized.

The thickness of the film layer 18 may be any one of the following values or within a range of any two of the following values: 10, 15, 20, 25, or 30 microns. The applied weight of nonwoven layer 26 may be any one of the following values or within a range of any two of the following values: 15, 20, 25, 30, 35, 40, 45, 50, 55, 60, 65, 70, 75, 80, 85, 90, 95, or 100 gsm. The thickness of nonwoven layer 26 may be any one of the following values or within a range of any two of the following values: 0.1, 0.5, 1.0, 1.5, or 2.0 mm. The applied weight of backcoat layer 12 may be any one of the following values or within a range of any two of the following values: 25, 50, 75, 100, 150, 200, 300, 400, or 500 gsm. The thickness of backcoat layer 12 may be any one of the following values or within a range of any two of the following values: 0.1, 0.2, 0.3, 0.4, 0.5, 0.6, 0.7, 0.8, 0.9, or 1.0 mm.

In one embodiment, film layer 18 and nonwoven layer 26 are laminated together using a hotmelt roto-gravure lamination process and subsequently cured for a cure period, thereby creating adhesive layer 24. The hotmelt adhesive may be a PUR adhesive. The applied weight of the hotmelt adhesive may be any one of the following values or within a range of any two of the following values: 5, 10, 15, 20, 25, or 30 gsm. The cure period may be about 1, 2, 3, 4, or 5 days. After the curing period ends, backcoat layer 12 may be coated onto first surface 22 of film layer 12, and the backcoat layer 12 is subsequently dried and curing in a temperature range of about 250 to 300° F. for 10 to 30 seconds in which the backcoat layer 12 is within the temperature range. Maintaining the upper end of this temperature range (e.g., 280 to 300° F.) is beneficial for backcoat layers that include a cross linker. The upper temperature range activates the cross linker to obtain a finished composite material that is more wash-durable.

In one embodiment, film layer 18 may be made of a moisture barrier (MB) material. A textile coating or layer has a moisture barrier if it can support a considerable column of water without water penetration through the finished composite material. One test for water permeability and penetration is AATCC Test Method 127-2008, available from the AATCC Technical Manual, 2012 Edition, pp. 207-208, which is hereby incorporated in its entirety by reference. In one embodiment, the finished composite material can withstand a hydrostatic resistance of at least 100, 120, 140, 160, 180, or 200 cm water column pressure. "Hydrostatic pressure" as used in at least one embodiment refers to the force distributed over an area exerted by water. In one or more embodiments, the MB material may exhibit water vapor transmission characteristics for improved breathability and end-user comfort. The MB material may also contain a flame retardant polymer.

The MB material may be a thermoplastic or thermoset polymer film. A non-limiting list of MB materials include thermoplastic polyurethane (TPU), polyester, polyamide, polypropylene, and polytetrafluoroethylene. The MB material may be a film with a relatively high melt temperature, such as a PTFE polymer film. In such instances, these films may also include an FR material. In other embodiments, the film may be made of a material that is inherently flame retardant.

In one embodiment, the film may be embossed or treated for authentication or to aid in handling during subsequent processes (e.g., cutting and sewing). Such treatments may enhance the film's aesthetics, and offer an alternative to a nonwoven treatment layer. The MB film may be printed with a logo using an ink on each or both sides of the film. The ink may include a taggant that can be used to authenticate the manufacturer's identity and, in the absence of the taggant, to identify counterfeit materials.

In one embodiment, backcoat layer 12 may be made from a non-acrylic polymeric material that includes a flame retardant (FR) material dispersed within a binder that serves to attach the FR material to a surface of the non-acrylic polymeric material. In one or more embodiments, the FR material is configured to actively suppress the formation of flames, instead of passively resisting burning. Non-limiting examples of non-acrylic binders include polyurethane, polyvinyl chloride (PVC) and blends thereof. The FR dispersion may also include thickening agents to achieve a desired viscosity for its application to a surface. The FR dispersion may also include a foaming agent that includes entrained air to improve pliability and/or flexibility of the multilayer substrate or the finished composite material. The FR dispersion may also contain antimicrobials for resisting the growth of bacteria and/or fungus. The FR dispersion may also include a colorant, pigment, or dyestuff to prevent an undesired condition where a layer, e.g., backcoat layer, on the other side of nonwoven layer 26 from the fabric substrate is visible. The FR dispersion may also include a phase change material for temperature modulation. The FR dispersion may also include a radiant heat reflective material.

In one embodiment, nonwoven layer 26 may be made of a relatively lightweight nonwoven textile material. The applied weight of the nonwoven textile material may be any one of the following values or within a range of any two of the following values: 20, 30, 40, 50, 60, 70, 80, 90, or 100 gsm. As described above, layer 26 may be made of a woven textile material or knit textile material. The woven textile material may be any one of the following values or within a range of any two of the following values: 50, 75, 100, 125, 150, 175, or 200 gsm. The knit textile material may be any one of the following values or within a range of any two of the following values: 50, 75, 100, 125, 150, 175, or 200 gsm.

The nonwoven layer 26 may be applied to the back (non-visible) surface of a fabric substrate. The nonwoven layer 26 is configured to char during combustion. The charring forms a solid material that remains after light gases and tar have been driven out or released from a carbonaceous material during the initial stage of combustion. The solid material reduces the likelihood of complete combustion in the areas where the solid material forms. Therefore, those areas may not form holes or apertures so that the combustion can consume the materials located underneath the nonwoven layer 26, e.g., foam cushions for a chair or mattress. One or more of these burn-resistant materials may pass regulatory standards, such as BS 5852 Source 5 (Crib 5) and/or California Technical Bulletin 133.

The burn-resistant material may be formed of a textile material, e.g., a nonwoven textile material, woven textile material, knit textile material, or blend thereof, made using predominantly (e.g., about 80%, 90%, 95% or 99% by weight) or solely fibers capable of leaving a char residue that serves to prevent a flame from being presented directly to materials (e.g., foam) placed behind or beneath a finished composite material. The burn-resistant material may also be made of fibers that resist burning. The burn-resistant material may also be made of fibers that actively suppress flames in the presence of flames. Non-limiting examples of burn-resistant materials include viscose FR materials, modacrylic materials, oxidated polyacrylonitrile, and polybenzimidazole (PBI) fiber materials. The burn-resistant material may be formed so that it is relatively thin, lightweight, uniform, supple, pliable and/or has a soft hand or touch. The burn-resistant material may include fibers converted into a continuous web using a spunlace, spunbond, or meltblown process. The applied weight of the spunlace fibers may be any one of the following values or within a range of any two of the following values: 30, 35, 40, 45, 50, 55, or 60 gsm. The applied weight of the spunbond fibers may be any one of the following values or within a range of any two of the following values: 10, 15, 20, 25, or 30 gsm. The applied weight of the meltblown fibers may be any one of the following values or within a range of any two of the following values: 10, 15, 20, 25, or 30 gsm.

In one embodiment, film layer 18 may be made from a TPU film material, the nonwoven layer 26 may include a fire retardant nonwoven material (comprising 25, 50, 75, or 100% of nonwoven layer 26), for example, a viscose FR, spunlace fire retardant nonwoven material, which are combined using hotmelt gravure lamination process using a PUR adhesive. This combination of materials is sufficiently heat resistant so that they are not damaged by the drying and curing of the subsequent application of backcoat layer 12, which in this and other embodiments, may be a non-acrylic polymer, for example, a non-halogenated fire retardant polymer material. In certain applications, backcoat layer 12 may be omitted to reduce the cost of multilayer substrate while maintaining a fire retardant property through the use of fire retardant nonwoven material.

Figure 2:
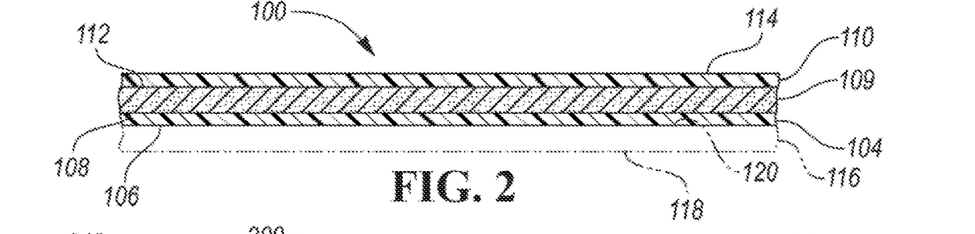
FIG. 2 depicts a cross-sectional view of a multilayer substrate according to another embodiment.

FIG. 2 depicts a cross-sectional view of a multilayer substrate 100 according to another embodiment. Multilayer substrate 100 includes film layer 104 having first and second surfaces 106 and 108, and protector layer 110 having first and second surfaces 112 and 114. Film layer 104 is applied to first surface 112 of protector layer 110 to form an interface between second surface 108 of film layer 104 and first surface 112 of protector layer 110. Multilayer substrate 100 may further include an optional backcoat layer 116 having first and second surfaces 118 and 120. Backcoat layer 116 is applied to first surface 106 of film layer 104 to form an interface between second surface 120 of backcoat layer 116 and first surface 106 of film layer 104. In certain embodiments, backcoat layer 116 is optional and not utilized.

The thickness of the film layer 104 may be any one of the following values or within a range of any two of the values set forth herein. The applied weight of protector layer 110 may be any one of the following values or within a range of any two of the following values: 5, 6, 7, 8, 9, 10, 11, 12, 13, 14, 15, or 20 gsm. The thickness of protector layer 110 may be any one of the following values or within a range of any two of the following values: 0.05, 0.1, 0.15, 0.2, 0.25, or 0.3 mm.

Protector layer 110 may protect film layer 104, e.g., moisture barrier film layer. An MB protector layer may be attached to the side of film layer opposite the side of the film layer facing the fabric substrate. The MB protector layer material may be a relatively lightweight textile material. The applied weight of the MB protector material may be any one of the following values or within a range of any two of the following values: 5, 10, 15, 20, 25, 30, 35, or 40 gsm. The MB protector material layer may protect the film layer, e.g., a moisture barrier film layer, from light abrasion. Also, the MB protector layer may have a lower coefficient of friction than the film layer. In those cases, the multilayer substrate or finished composite material would be less likely to grip a surface and would be easier to handle during subsequent processing (e.g., cutting and sewing). The application of an MB protector layer may also enhance the aesthetics by avoiding a plastic look and feel of the film layer. The MB protector material may also include FR fibers and/or materials. In one or more embodiments, the MB protector material layer is configured to be relatively thin, lightweight, uniform, supple, pliable, soft hand or touch and/or resists penetration of relatively hot adhesives in a liquid state. Non-limiting examples of MB protector materials includes spunbond fibers, meltblown fibers, spunlace, polyester, inherent FR polyester, polypropylene, polyamide, viscose FR material, liner fabric, textile material, knit textile material, woven textile material and/or blends thereof. The spunbond or meltblown materials may have an applied weight of any one of the following values or within a range of any two of the following values: 5, 10, 15, 20, 25, 30, 35, or 40 gsm. The spunlace material may have an applied weight of any one of the following values or within a range of any two of the following values: 40, 45, 50, 55, or 60 gsm.

In one embodiment, film layer 104 may be made of a thermoplastic polyurethane (TPU) film material and the protector layer 110 may be made of a relatively lightweight textile material. The film layer 104 and protector layer 110 can be combined using hotmelt gravure lamination process using a PUR adhesive. In such embodiments, the material for protector layer 110 is selected to resist adhesive penetration when the PUR adhesive is being applied in a hot, liquid state (e.g., in the temperature range of 90° C. to 125° C.). Resistance to liquid adhesive penetration is beneficial to reduce or eliminate the adhesive from binding subsequent layers of multilayer substrate 100 when it is rolled up on itself.

In certain embodiments, a hotmelt gravure lamination process is used to combine film layer 104 and protector layer 110. The process forms adhesive layer 109 as shown in FIG. 2. The use of the hotmelt gravure lamination process helps the resulting multilayer substrate 100 achieve flexibility and a surface with soft hand and touch. In other embodiments, backcoat layer 116 can be applied to film layer 104, and backcoat layer 116 may be formed from a non-acrylic polymer, for example, a non-halogenated FR latex. In one or more embodiments, the backcoat layer material is a non-acrylic polymer material and/or blend. In those embodiments, acrylic polymer materials may not be utilized because they are relatively more flammable than many non-acrylic polymer materials.

Figure 3:
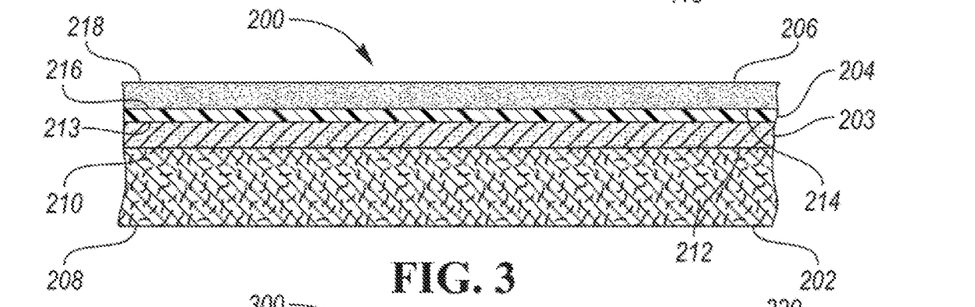
FIG. 3 depicts a cross-sectional view of a finished composite material according to an embodiment.

FIG. 3 depicts a cross-sectional view of a finished composite material 200 according to an embodiment. Finished composite material includes fabric substrate 202, film layer 204, and backcoat layer 206. Fabric substrate 202 includes front surface 208 and back surface 210. Film layer 204 includes first surface 213 and second surface 214. Backcoat layer 206 includes first surface 216 and second surface 218. Adhesive layer 203 is applied to back surface 210 of fabric substrate 202 to create an interface between back surface 210 of fabric substrate 202 and first surface 212 of adhesive layer 203. Film layer 204 may be formed of a moisture barrier material. Film layer 204 may be applied to fabric substrate 202 using a hot adhesive gravure lamination process to produce adhesive layer 203. Backcoat layer 206 is applied to second surface 214 of film layer 204 to form an interface between second surface 214 of film layer 204 and first surface 216 of backcoat layer 206. After the curing period for the hotmelt, backcoat layer 206 may be coated onto second surface 214 of film layer 204, and the backcoat layer 206 is subsequently dried and cured in a temperature range of about 250 to 300° F. for 10 to 30 seconds in which the backcoat layer 206 is within the temperature range. Maintaining the upper end of this temperature range (e.g., 280 to 300° F.) is beneficial for backcoat layers that include a cross linker. The upper temperature range activates the cross linker to obtain a finished composite material that is more wash-durable. Backcoat layer 206 may include a fire retardant material. By applying backcoat layer 206 directly to film layer 204 instead of directly to face fabric 202, one or more of the following benefits may be achieved: (a) the material of backcoat layer 206 may not strike through fabric substrate 202, which is typically porous; and (b) the ability to see backcoat layer 206 from the front surface 208 of fabric substrate 202 if backcoat layer 206 partially penetrates fabric substrate 208 is minimized or avoided. In certain embodiments, fabric composite material 200 has a superior pliability to a fabric composite material not including a film layer between the fabric substrate and the backcoat because the backcoat does not penetrate and bind to interstices within the fabric substrate.

In another embodiment, a finished composite material is made by laminating backcoat layer 12 of substrate 10 of FIG. 1 to a fabric substrate using a gravure PUR adhesive lamination process. First surface 14 of backcoat layer 12 is applied to the back surface of the fabric substrate. This application may be used with face fabrics that do not exhibit flame resistant properties, such as regular polyester materials that do not exhibit inherently fire retardant characteristics. The backcoat layer may include a fire retardant material. The fabric substrate may be treated with a fluorinated repellent and antimicrobial agent. This construction passes several flammability standards, including IMO Resolution A.652(16), European Union EN1021-1 and -2, British Standard (BS) 5852 Sources 0 and 1, and German DIN 4102 B2. This construction is beneficial because the fire retardant latex material of the backcoat layer is adjacent to the fabric substrate. The nonwoven layer of this construction may be a char barrier material, which aids in meeting the following flammability standards: BS 5852 Source 5 and California Technical Bulletin 133. In another embodiment, an MB protector layer can be used instead of a nonwoven layer or char barrier as shown in FIG. 2. This substitution may be beneficial if extra resistance to hole formation is not desired. In yet another embodiment, the backcoat layer 12 is omitted when a fabric substrate made from an inherently fire retardant material is utilized.

Figure 4:
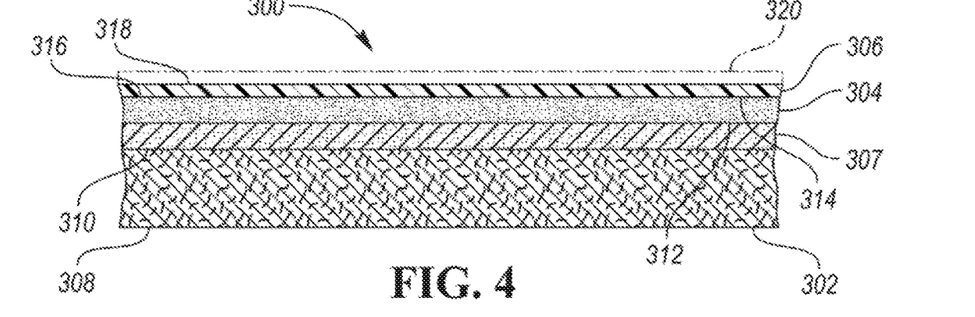
FIG. 4 depicts a cross-sectional view of a finished composite material according to an embodiment.

FIG. 4 depicts a cross-sectional view of a finished composite material 300 according to an embodiment. Finished composite material includes fabric substrate 302, backcoat layer 304, and film layer 306. Fabric substrate 302 includes front surface 308 and back surface 310. Backcoat layer 304 includes first surface 312 and second surface 314. Film layer 306 includes first surface 316 and second surface 318. Backcoat layer 304 is applied to back surface 310 of fabric substrate 302 via adhesive layer 307. Backcoat layer 304 may be coated onto back surface 310 of fabric substrate 302, and the backcoat layer 304 is subsequently dried and cured in a temperature range of about 250 to 300° F. for 10 to 30 seconds in which the backcoat layer 304 is within the temperature range. Maintaining the upper end of this temperature range (e.g., 280 to 300° F.) is beneficial for backcoat layers that include a cross linker. The upper temperature range activates the cross linker to obtain a finished composite material that is more wash-durable. Backcoat layer 304 may include a fire retardant material. Direct application of a backcoat layer to a fabric substrate may be beneficial when the hydrostatic resistance of the fabric substrate is less than 20 or 40 cm water column pressure. These characteristics minimize the amount of the backcoat layer that penetrates the interstices of the fabric substrate. Film layer 306 may be applied to dried and cured backcoat layer 304 using a hot adhesive (e.g., PUR adhesive) gravure lamination process. Film layer 306 is applied to second surface 314 of backcoat layer 304 to form an interface between second surface 314 of backcoat layer 304 and first surface 316 of film layer 306. Film layer 306 may be formed of a moisture barrier material. Optionally, a protector layer 320 can be applied to second surface 318 of film layer 306. In one or more embodiments, the protector layer may be made from a moisture barrier (MB) protector material. Use of the MB protector material layer may ease handling during cutting, sewing and other finishing operations by reducing the coefficient of friction of the back surface of the finished composite material.

In another embodiment, film layer 104 and protector layer 110 of multilayer substrate 100 of FIG. 2 are laminated to a fabric substrate. In this embodiment, the fabric substrate is made of inherently fire retardant fibers (e.g., inherent fire retardant polyester). Because of the fire retardant characteristics of the fabric substrate, backcoat layer 116 is omitted. Multilayer substrate 100 is laminated to the fabric substrate through a hot adhesive (e.g. PUR adhesive) gravure lamination process by applying adhesive to the back surface of the fabric substrate and applying multilayer substrate 100 by attaching first surface 106 of film layer 104 to the adhesive. Film layer 104 may be made from a moisture barrier material. Film layer 104 may impart aesthetic qualities (e.g., matte finish, textile-like appearance, soft hand, and/or low friction) in applications where relatively little or no added flame retardancy is desired (e.g., outdoor fabrics).

Set forth below are examples of finished composite materials and multilayer substrates according to one or more embodiments. As shown in the tables below, fourteen (14) samples were prepared. Samples 1-6 were prepared with a Sky face fabric and samples 7-12 were prepared with a Cuddle face fabric. The Cuddle face fabric is relatively highly textural and has a relatively high porosity. The Sky face fabric has lower texturing and porosity than the Cuddle face fabric. The Cuddle and Sky face fabrics are made from 100% regular polyester (not an inherent FR polyester). The Sky face fabric is about 1 mm thick and the Cuddle face fabric is about 2 mm thick. Samples 13 and 14 are samples of multilayer substrates.

Sample 1 is the Sky face fabric treated with a prime coat of oil and water repellent and silver ion antimicrobial finish applied through a pad bath finish. Sample 2 is the Sky face fabric with the prime coat finish and the application of a moisture barrier film on the back surface of the face fabric. Sample 3 is the Sky face fabric with the prime coat finish, the moisture barrier, and a backcoat applied to the moisture barrier. Sample 4 is the Sky face fabric with the prime coat and a backcoat applied directly to the back surface of the face fabric. Sample 5 is the Sky face fabric with the prime coat, the backcoat applied directly to the back surface of the face fabric, and the moisture barrier film applied to the backcoat. Sample 6 is treated with the prime coat and multilayer substrate of sample 13 is then applied to the prime coat treated sample.

Sample 7 is the Cuddle face fabric treated with a prime coat of oil and water repellent and silver ion antimicrobial finish applied through a pad bath finish. Sample 8 is the Cuddle face fabric with the prime coat finish and the application of a moisture barrier film on the back surface of the face fabric. Sample 9 is the Cuddle face fabric with the prime coat finish, the moisture barrier, and a backcoat applied to the moisture barrier. Sample 10 is the Cuddle face fabric with the prime coat and a backcoat applied directly to the back surface of the face fabric. Sample 11 is the Cuddle face fabric with the prime coat, the backcoat applied directly to the back surface of the face fabric, and the moisture barrier film applied to the backcoat. Sample 12 is treated with the prime coat and multilayer substrate of sample 13 is then applied to the prime coat treated sample.

Sample 13 is a multilayer substrate including a moisture barrier film applied to a viscose FR nonwoven fabric layer and a backcoat is applied to the moisture barrier film. Sample 14 is a moisture barrier film applied to a viscose FR nonwoven fabric layer.

As described above, the finished composite materials and multilayer substrates according to one or more embodiments impart flame retardancy properties while maintaining a more natural hand and/or better pliability. One test for pliability is ASTM 4032-08 (2012), titled Standard Test for Stiffness of Fabric by the Circular Bend Procedure, pp. 985-989, available from ASTM International, which is hereby incorporated by reference in its entirety. The test standard calls for the folding of a fabric against itself and then being placed on a platform with a circular aperture. A plunger is applied to the fabric sample and through the aperture while a strain gauge measures the force applied. The test result values are in grams-force.

Figure 5:
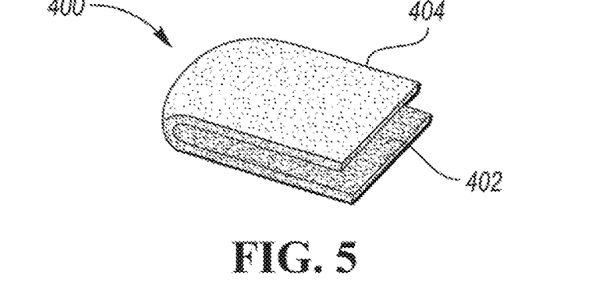
FIG. 5 depicts a perspective, fragmented view of a finished composite material folded for a stiffness test.

As shown in FIG. 5, a face fabric sample 400 is folded onto itself so that regions of the front surface 402 are contacting each other and regions of the back surface 404 are facing away from each other. The disclosed test did not account for the coefficient of friction of the exposed back surface layer. Accordingly, the values in the tables may be lower if the fabric sample was folded the other way with the front surface regions facing away and the back surface regions facing each other. A lower test value is indicative of a higher relative pliability, while a higher test value is indicative of a lower relative pliability.

Figure 6:
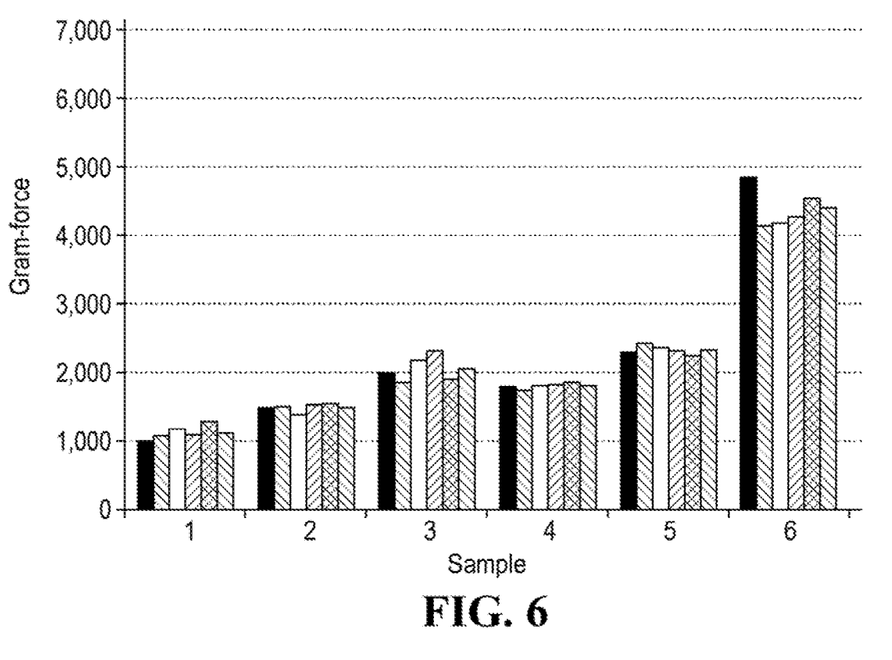
FIG. 6 is a graph showing multiple test results for each treated fabric in a first group.

Table 1 below shows the test values (grams-force) for multiple tests of each sample 1-6 and an average of the test results for each sample. FIG. 6 is a graph showing the multiple test results for each treated fabric in the first group.

|  | 1 | 2 | 3 | 4 | 5 | 6 |
|---|---|---|---|---|---|---|
| Test 1 | 988 | 1482 | 2024 | 1794 | 2288 | 4858 |
| Test 2 | 1086 | 1514 | 1860 | 1744 | 2436 | 4166 |
| Test 3 | 1168 | 1382 | 3290 | 1810 | 2354 | 4198 |
| Test 4 | 1086 | 1530 | 2322 | 1828 | 2322 | 4298 |
| Test 5 | 1284 | 1548 | 1910 | 1860 | 2256 | 4562 |
| Average | 1122 | 1491 | 2061 | 1807 | 2331 | 4416 |

Figure 7:
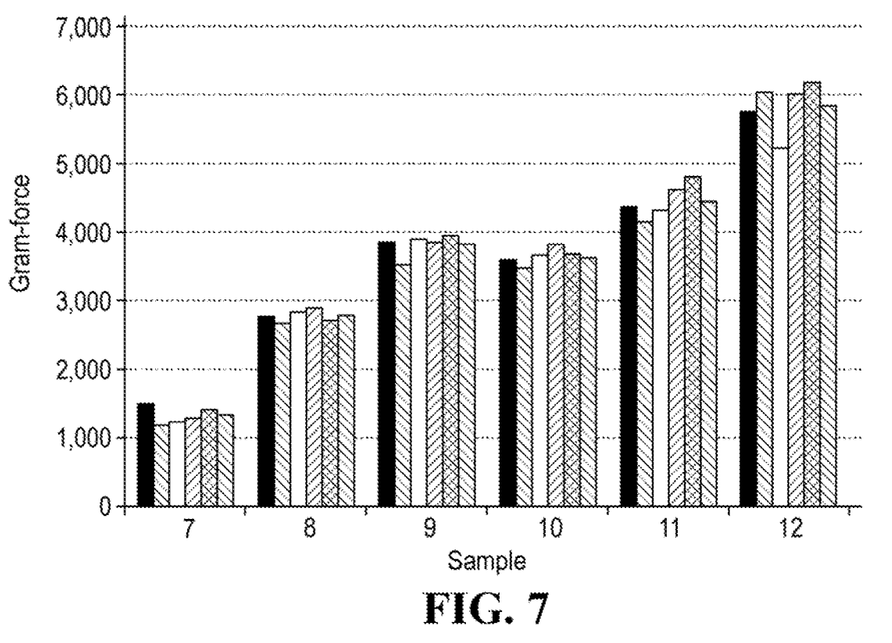
FIG. 7 is a graph showing multiple test results for each treated fabric in a second group.

Table 2 below shows the test values (grams-force) for multiple tests of each sample 7-12 and an average of the test results for each sample. FIG. 7 is a graph showing the multiple test results for each treated fabric in the second group.

|  | 7 | 8 | 9 | 10 | 11 | 12 |
|---|---|---|---|---|---|---|
| Test 1 | 1482 | 2750 | 3854 | 3606 | 4380 | 5764 |
| Test 2 | 1168 | 2668 | 3508 | 3474 | 4150 | 6060 |
| Test 3 | 1234 | 2832 | 3902 | 3656 | 4314 | 5236 |
| Test 4 | 1284 | 2882 | 3836 | 3820 | 4628 | 6010 |
| Test 5 | 1398 | 2700 | 3986 | 3688 | 4792 | 6192 |
| Average | 1313 | 2766 | 3814 | 3649 | 4453 | 5852 |

Table 3 below shows the test results (grams-force) for multiple tests of each sample 13 and 14 and an average of the test results for each sample.

|  | 13 | 14 |
|---|---|---|
| Test 1 | 410 | 246 |
| Test 2 | 362 | 246 |
| Test 3 | 344 | 278 |
| Test 4 | 344 | 246 |
| Test 5 | 394 | 278 |
| Average | 371 | 259 |

In one or more embodiments, a suitable stiffness value may be any one of the following values or within a range of any two of the following values: 1,400, 2,000, 2,500, 3,000, 3,500, 4,000, 4,500, 5,000, 5,500, 6,000 grams-force. These stiffness values provide a suitable pliability for finished composite materials having suitable flame retardance properties according to embodiments of the present invention.

While exemplary embodiments are described above, it is not intended that these embodiments describe all possible forms of the invention. For example, the fabric substrate, film layer, backcoat layer, protector layer, nonwoven layer and/or adhesive layer may include an FR material. While some embodiments disclose a fabric substrate as the substrate and a multilayer substrate being adhesively applied to the fabric substrate, other embodiments include applying a multilayer substrate to a seat cushion or mattress foam (or other form of mattress cushioning material) as the substrate without adhesive, and rather wrapping the multilayer substrate around the seat cushion or mattress foam. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A finished composite material comprising:
a film layer having first and second surfaces;
a fibrous material layer having first and second surfaces;
a discontinuous adhesive region layer situated between the film layer and the fibrous material layer, the discontinuous adhesive region layer adhering the second surface of the film layer to the first surface of the fibrous material layer, the discontinuous adhesive region layer forming a number of discrete and non-continuous regions including an interface between the second surface of the film layer and the first surface of the fibrous material layer such that the second surface of the film layer touches the first surface of the fibrous material layer at the interface, and the number of discrete and non-continuous regions forming a number of non-adhesive regions therebetween configured to not resist flexing of the film layer and the fibrous material layer; and
an upholstery or mattress textile fabric substrate having a thickness of 0.5 to 2.0 millimeters and having front and back surfaces, and the front surface of the upholstery or mattress textile fabric substrate configured to contact a user of the upholstery or mattress textile fabric substrate.

2. The finished composite material of claim 1, further comprising a backcoat layer having first and second surfaces, the second surface of the backcoat layer is applied to the first surface of the film layer.

3. The finished composite material of claim 1, wherein the fibrous material layer is a char barrier material.

4. The finished composite material of claim 1, wherein the film layer is a moisture barrier material.

5. The finished composite material of claim 1, wherein the discontinuous adhesive region layer is formed of an adhesive of a reactive polyurethane (PUR) adhesive.

6. The finished composite material of claim 1, wherein the film layer or fibrous material layer includes a marking to authenticate a source of the finished composite material.

7. The finished composite material of claim 1, wherein the film layer is formed of a thermoplastic polyurethane (TPU) material.

8. The finished composite material of claim 1, wherein the second surface of the fibrous material layer faces away from the front surface of the upholstery or mattress textile fabric substrate.

9. The finished composite material of claim 1, wherein the second surface of the fibrous material layer faces towards from the front surface of the upholstery or mattress textile fabric substrate.

10. A finished composite material comprising:
a film layer having first and second surfaces;
a fibrous material layer having first and second surfaces;
a backcoat layer including a non-acrylic binder and having first and second surfaces, the second surface of the film layer applied to the first surface of the fibrous material layer, and the second surface of the backcoat layer applied to the first surface of the film layer;
a discontinuous adhesive region layer situated between the film layer and the fibrous material layer, the discontinuous adhesive region layer adhering the second surface of the film layer to the first surface of the fibrous material layer, the discontinuous adhesive region layer forming a number of discrete and non-continuous regions including an interface between the second surface of the film layer and the first surface of the fibrous material layer such that the second surface of the film layer touches the first surface of the fibrous material layer at the interface, and the number of discrete and non-continuous regions forming a number of non-adhesive regions therebetween configured to not resist flexing of the backcoat layer, the film layer and the fibrous material layer; and
an upholstery or mattress textile fabric substrate having a thickness of 0.5 to 2.0 millimeters and having front and back surfaces, the second surface of the fibrous material layer facing away from the back surface of the upholstery or mattress textile fabric substrate, and the front surface of the upholstery or mattress textile fabric substrate configured to contact a user of the upholstery or mattress textile fabric substrate.

11. The finished composite material of claim 10, wherein the backcoat layer, the film layer, and/or fibrous material layer include a non-halogenated flame retardant material.

12. The finished composite material of claim 10, wherein the discontinuous adhesive region layer is formed of an adhesive of a reactive polyurethane (PUR) adhesive.

13. The finished composite material of claim 10, wherein the fibrous material layer is a char barrier material.

14. The finished composite material of claim 10, wherein the fibrous material layer is a moisture barrier protector material.

15. The finished composite material of claim 10, wherein the film layer or fibrous material layer includes a marking to authenticate a source of the finished composite material.

16. The finished composite material of claim 10, wherein the film layer is formed of a thermoplastic polyurethane (TPU) material.

17. A finished composite material comprising:
a backcoat layer having first and second surfaces;
a film layer having first and second surfaces, the second surface of the film layer applied to the first surface of the backcoat layer;
an upholstery or mattress textile fabric substrate having a thickness of 0.5 to 2.0 millimeters and having front and back surfaces, the second surface of the backcoat layer facing away from the front surface of the upholstery or mattress textile fabric substrate, and the front surface of the upholstery or mattress textile fabric substrate configured to contact a user of the upholstery or mattress textile fabric substrate; and
a discontinuous adhesive region layer situated between the film layer and the upholstery or mattress fabric substrate, the discontinuous adhesive region layer adhering the first surface of the film layer to the back surface of the upholstery or mattress fabric substrate, the discontinuous adhesive region layer forming a number of discrete and non-continuous regions including an interface between the first surface of the film layer and the back surface of the upholstery or mattress textile fabric substrate such that the first surface of the film layer touches the back surface of the upholstery or mattress textile fabric substrate at the interface, and the number of discrete and non-continuous regions forming a number of non-adhesive regions therebetween configured to not resist flexing of the backcoat layer, the film layer and the upholstery or mattress textile fabric substrate.

18. The finished composite material of claim 17, further comprising a cushioning material is configured to be situated beneath or behind the second surface of the backcoat layer.

19. The finished composite material of claim 18, wherein the upholstery or mattress textile fabric substrate is the upholstery textile fabric substrate and the cushioning material is a seat cushion.

20. The finished composite material of claim 18, wherein the upholstery or mattress textile fabric is the mattress textile fabric and the cushioning material is a mattress foam.

* * * * *